UNITED STATES PATENT OFFICE.

HARRY A. SCHNELBACH, OF STEUBENVILLE, OHIO, ASSIGNOR, BY MESNE ASSIGNMENTS, TO MACBETH-EVANS GLASS COMPANY, OF PITTSBURGH, PENNSYLVANIA, A CORPORATION OF PENNSYLVANIA.

GLASS AND BATCH FOR MAKING THE SAME.

1,143,788. Specification of Letters Patent. Patented June 22, 1915.

No Drawing. Application filed July 20, 1912. Serial No. 710,554.

*To all whom it may concern:*

Be it known that I, HARRY A. SCHNELBACH, a citizen of the United States, residing in the city of Steubenville, county of Jefferson, and State of Ohio, have invented new and useful Glass and Batch for Making the Same, of which the following is a specification.

My invention relates to a new and useful composition for the manufacture of translucent and opaque glass.

My invention consists in the composition hereinafter specified for the manufacture of translucent and opaque glass.

In the manufacture of my new and improved glass, I use the following mixture or batch of ingredients, substantially in the proportions by weight hereinafter indicated, to-wit: sand, 345.8 pounds; litharge, 56.8 pounds; soda ash (carbonate of soda), 86.4 pounds; cryolite, 20 pounds; aluminum oxid, 60 pounds; niter, 32 pounds; borax, 8 pounds; plaster of Paris, (calcium sulfate, $CaSO_4$) 5 pounds.

These ingredients, in substantially these proportions, thoroughly ground, pulverized and mixed, are placed in the ordinary glass pot in a glass-house furnace and heated until entirely fused, with the result that they produce a glass that is translucent, opaque and free from specks; a glass which when pressed into proper shapes for use with electric or gas light, has more than ordinary powers for reflecting and diffusing, and at the same time absorbing but very little of the light with which it is used.

I have discovered that three of the above ingredients, to-wit, cryolite, aluminum oxid and plaster of Paris, when used together in substantially the proportions herein set forth, have the effect of clouding or rendering translucent and at the same time opaque, the ordinary crystal glass which would result from the mixing of the other ingredients of the batch or mix hereinbefore specified. The result of the use of the three ingredients, cryolite, oxid of alumina and plaster of Paris, as affecting the translucency, the opacity, and the diffusive and deflective powers of the glass manufactured from the ingredients herein specified, is similar with any batch that will produce the ordinary crystal glass whether made with a lead or a lime base, provided additional ingredients equivalent to niter and borax are used therewith.

The batch set forth totals 614 pounds. The aluminum in the batch is contained in the aluminum oxid ($Al_2O_3$) and in the cryolite ($Na_3AlF_6$), the percentage of aluminum in these two compounds being respectively 52.9% and 12.9%, so that in the 60 pounds of aluminum oxid there are 31.74 pounds of aluminum, and in the cryolite there are 2.58 pounds of aluminum, a total of 34.32 pounds or 5.59% of the entire batch. The fluorin in the batch is contained in the cryolite which is 54.3% fluorin so that in the 20 pounds of cryolite there are 10.86 pounds of fluorin or 1.77% of the entire batch. The plaster of Paris ($CaSO_4$) comprises 5 pounds or .81% of the entire batch, the amount of sulfur in the plaster of Paris being 23.6% thereof or .19% of the total batch.

As the aluminum, fluorin, and sulfur are the coloring or opacifying agents, other compounds containing them might be substituted, provided an adjustment be made to secure the proper amounts of said elements as heretofore set forth. The amount of the opacifying agents may also be varied depending upon the opacity desired.

I claim;

1. A batch for producing glass consisting of a foundation mixture capable when fused of producing a substantially colorless glass, so combined with a sulfate and aluminum and fluorin compounds that the resulting glass will contain undecomposed sulfate.

2. A batch for producing glass consisting of a foundation mixture capable when fused of producing a substantially colorless glass, combined with a sulfate and with aluminum and fluorin compounds and free from any material tending to decompose the sulfate at the working temperature of a glass furnace.

3. A batch for producing glass consisting of a foundation mixture capable when fused of producing a substantially colorless glass with compounds containing aluminum and fluorin and a sulfate, the amount of aluminum in the batch being in excess of the amount of fluorin, the amount of fluorin being in excess of that of the sulfur in the sulfate, and the aluminum, fluorin, and sulfur together comprising less than 10% of the total batch.